(12) United States Patent
Hansalia

(10) Patent No.: US 12,199,821 B2
(45) Date of Patent: Jan. 14, 2025

(54) OPERATION-BASED SYNCHRONIZING OF SUPERVISORY MODULES

(71) Applicant: Ruckus IP Holdings LLC, Claremont, NC (US)

(72) Inventor: Rakesh G. Hansalia, Milpitas, CA (US)

(73) Assignee: Ruckus IP Holdings LLC, Claremont, NC (US)

( * ) Notice: Subject to any disclaimer, the term of this patent is extended or adjusted under 35 U.S.C. 154(b) by 0 days.

(21) Appl. No.: 17/353,998

(22) Filed: Jun. 22, 2021

(65) Prior Publication Data

US 2021/0409269 A1    Dec. 30, 2021

Related U.S. Application Data

(60) Provisional application No. 63/046,463, filed on Jun. 30, 2020.

(51) Int. Cl.
| | |
|---|---|
| *H04L 41/0816* | (2022.01) |
| *H04L 41/0604* | (2022.01) |
| *H04L 41/0654* | (2022.01) |
| *H04L 41/08* | (2022.01) |
| *H04L 43/0823* | (2022.01) |
| *H04L 43/10* | (2022.01) |
| *H04L 69/40* | (2022.01) |

(52) U.S. Cl.
CPC ...... *H04L 41/0816* (2013.01); *H04L 41/0627* (2013.01); *H04L 41/0654* (2013.01); *H04L 41/0886* (2013.01); *H04L 43/0823* (2013.01); *H04L 43/10* (2013.01); *H04L 69/40* (2013.01)

(58) Field of Classification Search
None
See application file for complete search history.

(56) References Cited

U.S. PATENT DOCUMENTS

| | | | |
|---|---|---|---|
| 2002/0095221 A1* | 7/2002 | Cook | G05B 9/03 700/4 |
| 2008/0154879 A1* | 6/2008 | Lin | G06F 16/9535 |
| 2008/0320261 A1* | 12/2008 | Colgrove | G06F 11/2071 711/E12.103 |
| 2010/0017647 A1* | 1/2010 | Callaway | G06F 11/1641 714/48 |
| 2011/0265097 A1* | 10/2011 | England | G06F 9/545 718/106 |

(Continued)

*Primary Examiner* — Joshua Joo
(74) *Attorney, Agent, or Firm* — Steven Stupp

(57) ABSTRACT

An electronic device that selectively performs an action is described. During operation, the electronic device may receive a high-level operation from a second electronic device, where the electronic device provides a standby supervisory module for a computer network device (such as a switch or a router) and the second electronic device provides an active supervisory module for the computer network device, and where the high-level operation includes one or more sub-operations (such as primitive operations). Then, the electronic device may store the high-level operation in memory, where the high-level operation is associated with an identifier in a sequential set of identifiers. Moreover, the electronic device may receive information indicating an occurrence of an event. In response, the electronic device may perform the action.

17 Claims, 8 Drawing Sheets

(56) References Cited

U.S. PATENT DOCUMENTS

| | | | |
|---|---|---|---|
| 2013/0138893 A1* | 5/2013 | Maeda | G06F 13/28 |
| | | | 711/E12.001 |
| 2013/0179480 A1* | 7/2013 | Agarwal | G06F 16/16 |
| | | | 707/822 |
| 2014/0310701 A1* | 10/2014 | Chylinski | G06F 8/65 |
| | | | 717/173 |
| 2016/0239341 A1* | 8/2016 | Chen | G06F 9/4881 |
| 2016/0380846 A1* | 12/2016 | Boerner | G06F 9/5011 |
| | | | 709/224 |
| 2018/0097879 A1* | 4/2018 | Johnson | H04L 67/1095 |
| 2019/0104061 A1* | 4/2019 | Zhang | H04L 41/042 |
| 2019/0129751 A1* | 5/2019 | Stanfill | G06F 9/546 |
| 2020/0089782 A1* | 3/2020 | Jain | G06F 16/27 |
| 2020/0112628 A1* | 4/2020 | Barszczak | G06F 11/1687 |
| 2021/0072963 A1* | 3/2021 | Bequet | G06N 3/0454 |
| 2022/0321398 A1* | 10/2022 | Karuppiah | H04L 41/0654 |

* cited by examiner

OPERATION-BASED SYNCHRONIZING OF SUPERVISORY MODULES

CROSS REFERENCE TO RELATED APPLICATIONS

This application claims priority under 35 U.S.C. 119(e) to: U.S. Provisional Application Ser. No. 63/046,463, "Operation-Based Synchronizing of Supervisory Modules," filed on Jun. 30, 2020, by Rakesh G. Hansalia, the contents of which are herein incorporated by reference.

FIELD

The described embodiments relate to techniques for synchronizing an active supervisory module and a standby supervisory module based at least in part on operations, and without providing operational states or configuration data.

BACKGROUND

In a highly available network switch or router, there are usually two supervisory modules, both of which attempt to maintain identical operational state and configuration data. Notably, a first supervisory module, which is deemed 'active,' actively performs any operation that generates a change in the operational state and the configuration data, and maintains full control of the hardware and its programming. A second supervisory module, which is deemed 'standby,' passively performs a hot standby role by maintaining an identical copy of the operational state and configuration data. This second supervisory module actively awaits to take over the active role if the active supervisory module fails.

Typically, the identical operational state and configuration data on the active supervisory module and the standby supervisory module are maintained by synchronizing this data in the active supervisory module and the standby supervisory module. For example, when an operation is actively performed on the active supervisory module only, it results in modifications to various state and configuration variables. These data changes trigger synchronization of the modified data to the standby supervisory module.

Because this approach involves multiple discrete synchronization operations or trips between the active supervisory module and the standby supervisory module during the duration of operation, any failure during this time interval may result in incomplete synchronization of the data, which, in turn, results in an inconsistent state of the standby supervisory module. In this situation, when the standby supervisory module takes over the active role and becomes the new active supervisory module, it may need to perform reconciliation in order to obtain the correct operational state and configuration data. However, reconciliation is typically time-consuming and error prone.

SUMMARY

In a first group of embodiments, an electronic device is described. This electronic device may include: an interface circuit that communicates with a second electronic device; a processor; and a memory that stores program instructions, where, when executed by the processor, the program instructions cause the electronic device to perform operations. Notably, during operation, the electronic device may receive a high-level operation from the second electronic device, where the electronic device provides a standby supervisory module for a computer network device (such as a switch or a router) and the second electronic device provides an active supervisory module for the computer network device, and where the high-level operation includes one or more sub-operations (such as primitive operations). Then, the electronic device may store the high-level operation in the memory (such as in a queue), where the high-level operation is associated with an identifier in a sequential set of identifiers. Moreover, the electronic device may receive information indicating an occurrence of an event. In response, the electronic device may perform an action.

For example, the event may include completion of execution of the high-level operation by the second electronic device. In response, the action may include the electronic device performing the high-level operation.

Alternatively, the event may include failure of the execution of the high-level operation by the second electronic device. In response, the action may include the electronic device not performing execution of the high-level operation.

Furthermore, the event may include a failure or lack of availability of the second electronic device. In response, the action may include the electronic device performing the high-level operation and taking over as the active supervisory module. In some embodiments, the failure or lack of availability may be based at least in part on one or more pings or heartbeat messages to the second electronic device.

Note that when the electronic device and the second electronic device perform the high-level operation, their operational state and configuration data may be synchronized, without the second electronic device providing the operational state and the configuration data to the electronic device.

In some embodiments, the electronic device and the second electronic device may have one or more threads, and a given thread may have the same context or may be mirrored in electronic device and the second electronic device.

Another embodiment provides a computer-readable storage medium for use with the electronic device. When executed by the electronic device, this computer-readable storage medium causes the electronic device to perform at least some of the aforementioned operations.

Another embodiment provides a method, which may be performed by the electronic device. This method includes at least some of the aforementioned operations.

In a second group of embodiments, a second electronic device is described. This second electronic device may include: an interface circuit that communicates with an electronic device; a processor; and a memory that stores program instructions, where, when executed by the processor, the program instructions cause the second electronic device to perform operations. Notably, during operation, the second electronic device may receive a high-level operation, where the second electronic device provides an active supervisory module for a computer network device (such as a switch or a router), and where the high-level operation includes one or more sub-operations (such as primitive operations). Then, the second electronic device may store the high-level operation in the memory (such as in a queue), where the high-level operation is associated with an identifier in a sequential set of identifiers. Moreover, the second electronic device may provide the high-level operation to the second electronic device that provides a standby supervisory module for the computer network device. Next, the second electronic device may receive information indicating an occurrence of an event. In response, the second electronic device performs an action.

For example, the event may include a confirmation from the electronic device that the high-level operation is being held or is pending. In response, the action may include the second electronic device performing the high-level operation.

Alternatively, the event may include completion of execution of the high-level operation by the second electronic device. In response, the action may include the second electronic device instructing the electronic device to perform the high-level operation.

Furthermore, the event may include failure of the execution of the high-level operation by the second electronic device. In response, the action may include the second electronic device instructing the electronic device not to perform or to abort the high-level operation.

Note that when the electronic device and the second electronic device perform the high-level operation, their operational state and configuration data may be synchronized, without the second electronic device providing the operational state and the configuration data to the electronic device.

In some embodiments, the electronic device and the second electronic device may have one or more threads, and a given thread may have the same context or may be mirrored in electronic device and the second electronic device.

Another embodiment provides a computer-readable storage medium for use with the second electronic device. When executed by the second electronic device, this computer-readable storage medium causes the second electronic device to perform at least some of the aforementioned operations.

Another embodiment provides a method, which may be performed by the second electronic device. This method includes at least some of the aforementioned operations.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
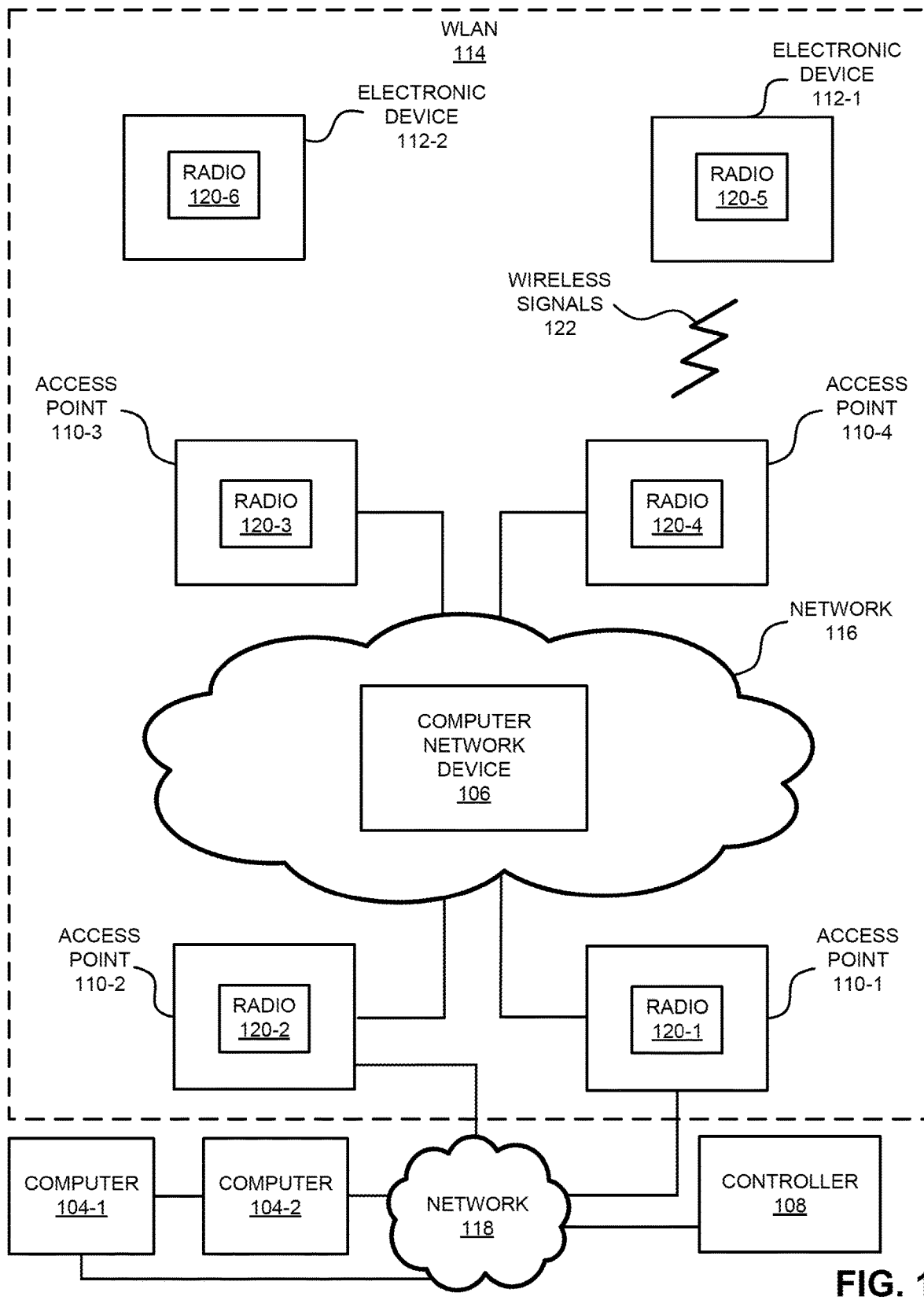
FIG. 1 is a block diagram illustrating an example of communication among access points and electronic devices in a network in accordance with an embodiment of the present disclosure.

An electronic device that selectively performs an action is described. During operation, the electronic device may receive a high-level operation from a second electronic device, where the electronic device provides a standby supervisory module for a computer network device (such as a switch or a router) and the second electronic device provides an active supervisory module for the computer network device, and where the high-level operation includes one or more sub-operations (such as primitive operations). Then, the electronic device may store the high-level operation in memory (such as a queue), where the high-level operation is associated with an identifier in a sequential set of identifiers. Moreover, the electronic device may receive information indicating an occurrence of an event. In response, the electronic device may perform the action.

For example, the event may include completion of execution of the high-level operation by the second electronic device. In response, the electronic device may perform the high-level operation. Alternatively, the event may include failure of the execution of the high-level operation by the second electronic device. In response, the electronic device may not perform or may abort execution of the high-level operation. Furthermore, the event may include a failure or lack of availability of the second electronic device. In response, the electronic device may take over as the active supervisory module and may perform the high-level operation. In some embodiments, the failure or lack of availability may be based at least in part on one or more pings or heartbeat messages to the second electronic device.

By selectively performing the action, these synchronization techniques may maintain synchronization of operational state and configuration data of the electronic device and the second electronic device, without the second electronic device providing the operational state and the configuration data to the electronic device. Moreover, the synchronization techniques may eliminate incomplete synchronization because of a failure of one or more of the sub-operations in the high-level operation in the second electronic device. Therefore, the synchronization techniques may eliminate an inconsistent operational state or incorrect configuration data in the electronic device. Consequently, the synchronization techniques when the electronic device takes over the active role, it may not need to perform reconciliation in order to obtain the correct operational state and configuration data. Thus, the synchronization techniques may be less time-consuming or error prone that existing synchronization techniques.

In the discussion that follows, an access point and/or an electronic device (such as a recipient electronic device, which is sometimes referred to as a 'client') may communicate packets or frames in accordance with a wireless communication protocol, such as an Institute of Electrical and Electronics Engineers (IEEE) 802.11 standard (which is sometimes referred to as 'Wi-Fi,' from the Wi-Fi Alliance of Austin, Tex.), Bluetooth (from the Bluetooth Special Interest Group of Kirkland, Wash.), and/or another type of wireless interface. In the discussion that follows, Wi-Fi is used as an illustrative example. For example, an IEEE 802.11 standard may include one or more of: IEEE 802.11a, IEEE 802.11b, IEEE 802.11g, IEEE 802.11-2007, IEEE 802.11n, IEEE 802.11-2012, IEEE 802.11-2016, IEEE 802.11ac, IEEE 802.11ax, IEEE 802.11ba, IEEE 802.11be, or other present or future developed IEEE 802.11 technologies.

However, a wide variety of communication protocols (such as Long Term Evolution or LTE, another cellular-telephone communication protocol, etc.) may be used. The wireless communication may occur in one or more bands of frequencies, such as: a 900 MHz, a 2.4 GHz, a 5 GHz, 6 GHz, the Citizens Broadband Radio Spectrum or CBRS (e.g., a frequency band near 3.5 GHz), a band of frequencies used by LTE or another cellular-telephone communication protocol or a data communication protocol, and/or a 60 GHz frequency band. (Note that IEEE 802.11ad communication over a 60 GHz frequency band is sometimes referred to as 'WiGig.' In the present discussion, these embodiments also encompassed by 'Wi-Fi.') In some embodiments, communication between electronic devices may use multi-user transmission (such as orthogonal frequency division multiple access or OFDMA).

Moreover, the electronic device and/or the access point may communicate with one or more other access points, one or more computer network devices (such as a router or a switch) and/or computers in a network using a wireless or a wired communication protocol, such as an IEEE 802.11 standard, an IEEE 802.3 standard (which is sometimes referred to as 'Ethernet') and/or another type of wired or wireless interface. In the discussion that follows, Ethernet is used as an illustrative example of communication between the electronic device and/or the access point and the one or more other access points, the one or more computer network devices and/or computers in the network.

FIG. 1 presents a block diagram illustrating an example of communication among components in WLAN 114 (which is used as an example of a network), including one or more access points 110 and electronic devices 112 (such as a cellular telephone, and which are sometimes referred to as 'clients'), in a in accordance with some embodiments. Access points 110 may communicate with each other in WLAN 114 using wireless and/or wired communication (such as by using Ethernet or a communication protocol that is compatible with Ethernet). Note that access points 110 may include a physical access point and/or a virtual access point that is implemented in software in an environment of an electronic device or a computer. In addition, at least some of access points 110 (such as access points 110-3 and 110-4) may communicate with electronic devices 112 using wireless communication.

The wired and/or wireless communication among components in WLAN 114 may occur via network 116 (such as an intra-net, a mesh network, point-to-point connections and/or the Internet) and may use a network communication protocol, such as Ethernet. For example, WLAN 114 may include a computer network device 106, such as a switch or a router.

Furthermore, the wireless communication using Wi-Fi may involve: transmitting advertising frames on wireless channels, detecting one another by scanning wireless channels, establishing connections (for example, by transmitting association or attach requests), and/or transmitting and receiving packets or frames (which may include the association requests and/or additional information as payloads). In some embodiments, the wired and/or wireless communication among access points 110 also involves the use of dedicated connections, such as via a peer-to-peer (P2P) communication technique. Therefore, access points 110 may support wired communication outside of WLAN 114 (such as Ethernet) and wireless communication within WLAN 114 (such as Wi-Fi), and components in WLAN 114 may support a wired communication protocol for communicating via network 118 (such as the Internet) with electronic devices (such as a computers 104 or a controller 108 of WLAN 114, which may be remotely located from WLAN 114). While computers 104 and controller 108 are illustrated in FIG. 1 as being remotely located from WLAN 114, in other embodiments computers 104 and/or controller 108 may be local, such as within or proximate to WLAN 114.

Figure 8:
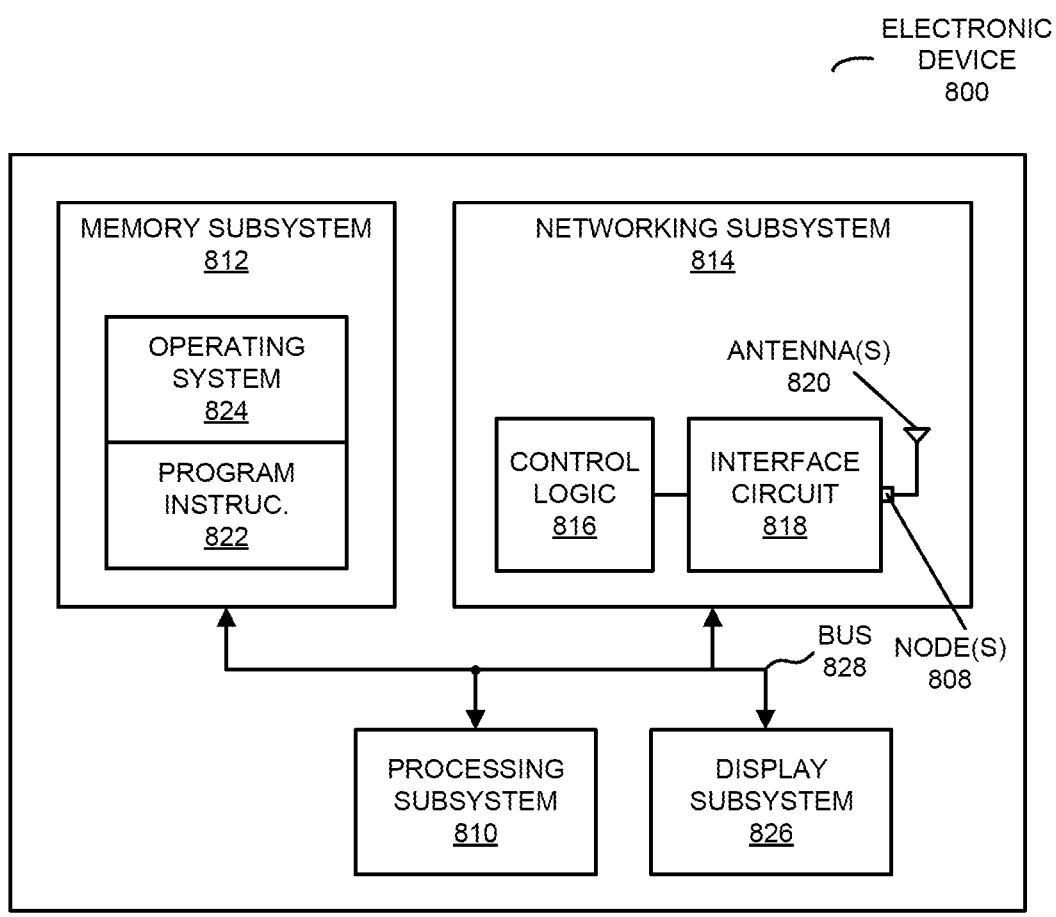
FIG. 8 is a block diagram illustrating an example of an electronic device in accordance with an embodiment of the present disclosure.

As described further below with reference to FIG. 8, computer network device 106, access points 110 and/or electronic devices 112 may include subsystems, such as a networking subsystem, a memory subsystem and a processor subsystem. In addition, access points 110 and electronic devices 112 may include radios 120 in the networking subsystems. More generally, access points 110 and electronic devices 112 can include (or can be included within) any electronic devices with the networking subsystems that enable access points 110 and electronic devices 112 to communicate with each other using wireless and/or wired communication. This wireless communication can comprise transmitting advertisements on wireless channels to enable access points 110 and/or electronic devices 112 to make initial contact or detect each other, followed by exchanging subsequent data/management frames (such as association requests and responses) to establish a connection, configure security options (e.g., Internet Protocol Security), transmit and receive packets or frames via the connection, etc. Note that while instances of radios 120 are shown in access points 110 and electronic devices 112, one or more of these instances may be different from the other instances of radios 120.

As can be seen in FIG. 1, wireless signals 122 (represented by a jagged line) are transmitted from radio 120-4 in access point 110-4. These wireless signals may be received by radio 120-5 in electronic device 112-1. Notably, access point 110-4 may transmit packets or frames. In turn, these packets or frames may be received by electronic device 112-1. Moreover, access point 110-4 may allow electronic device 112-1 to communicate with other electronic devices, computers and/or servers via networks 116 and/or 118.

Note that the communication among access points 110 and/or with electronic devices 112 (and, more generally, communication among components in WLAN 114) may be characterized by a variety of performance metrics, such as: a received signal strength (RSSI), a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

In the described embodiments processing a packet or frame in computer network device 106, access points 110 and electronic devices 112 includes: receiving signals (such as wireless signals 122) corresponding to the packet or frame; decoding/extracting the packet or frame from received wireless signals 122 to acquire the packet or frame; and processing the packet or frame to determine information contained in the packet or frame.

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

As noted previously, attempting to synchronize computers 104 by exchanging operational state and configuration data can be time-consuming and error prone. As described further below with reference to FIGS. 2-7, in order to address these problems, either or both of computers 104 may perform the synchronization techniques. Notably, a first of computers 104 (such as computer 104-1) may provide an active supervisory module (or unit) for computer network device 106, and a second of computers 104 (such as computer 104-2) may provide a standby supervisory module (or unit) for computer network device 106.

During operation, computer 104-1 may receive a high-level operation, where the high-level operation includes one or more sub-operations (such as primitive operations). Then, computer 104-1 may store the high-level operation in memory, where the high-level operation may be associated with an identifier in a sequential set of identifiers. The sequential set of identifiers may allow one or more operations in the memory to be performed in order. Moreover, computer 104-1 may provide the high-level operation to computer 104-2. Next, computer 104-1 may receive information indicating an occurrence of an event. In response, computer 104-1 may perform an action.

For example, the event may include a confirmation from computer 104-2 that the high-level operation is being held or is pending. In response, the action may include computer 104-1 performing the high-level operation. Alternatively, the event may include completion of execution of the high-level operation by computer 104-1. In response, the action may include computer 104-1 instructing computer 104-2 to perform the high-level operation. Furthermore, the event may include failure of the execution of the high-level operation by computer 104-1. In response, the action may include computer 104-1 instructing computer 104-2 not to perform or to abort the high-level operation.

Moreover, during operation, computer 104-2 may receive the high-level operation from computer 104-1. Then, computer 104-2 may store the high-level operation in memory, where the high-level operation may be associated with an identifier in a sequential set of identifiers. The sequential set of identifiers may allow one or more operations in the memory to be performed in order. Moreover, computer 104-2 may receive information indicating an occurrence of an event. In response, computer 104-2 may perform an action.

For example, the event may include completion of execution of the high-level operation by computer 104-1. In response, the action may include computer 104-2 performing the high-level operation. Alternatively, the event may include failure of the execution of the high-level operation by computer 104-1. In response, the action may include computer 104-2 not performing execution of the high-level operation. Furthermore, the event may include a failure or lack of availability of computer 104-1. In response, the action may include computer 104-2 performing the high-level operation and taking over as the active supervisory module. In some embodiments, the failure or lack of availability may be based at least in part on one or more pings or heartbeat messages to computer 104-1.

Note that when computers 104 perform the high-level operation, their operational state and configuration data may be synchronized, without computer 104-1 providing the operational state and the configuration data to computer 104-2. In some embodiments, computers 104 may have one or more threads, and a given thread may have the same context or may be mirrored in computers 104.

In this way, computers 104 may maintain synchronization of operational state and configuration data without an active supervisory module exchanging or providing the operational state and the configuration data to a standby supervisory module. In the processor, the synchronization techniques may eliminate a need for reconciliation and, thus, may reduce the time needed to maintain synchronization. This capability may improve communication performance (e.g., in computer network device 106). Consequently, the synchronizations techniques may improve the user experience when using computer network device 106 and, more generally, WLAN 114.

While the preceding embodiments illustrate the implementation of the synchronization techniques using computers 104, in other embodiments the synchronization techniques may be implemented in one or more instances of a computer network device, such as in computer network device 106.

Figure 2:
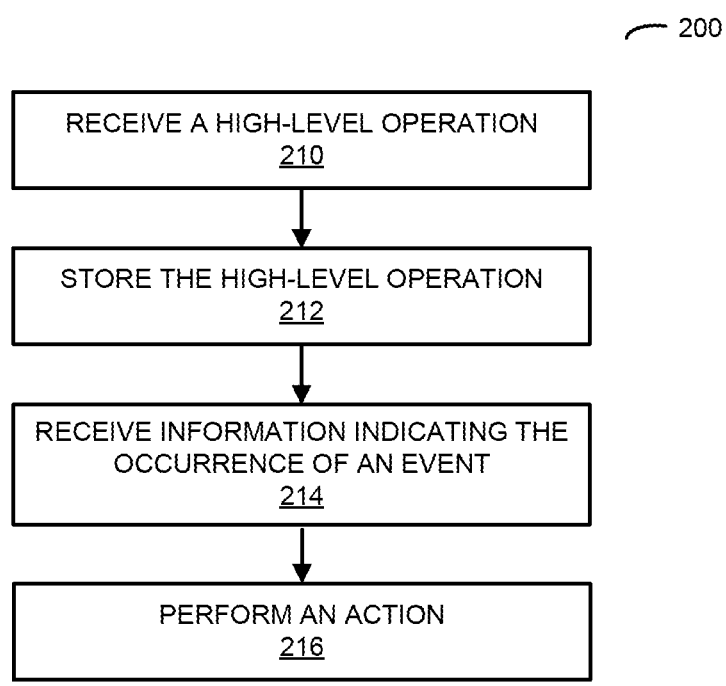
FIG. 2 is a flow diagram illustrating an example of a method for selectively performing an action using an electronic device in FIG. 1 in accordance with an embodiment of the present disclosure.

We now describe embodiments of a method. FIG. 2 presents a flow diagram illustrating an example of a method 200 for selectively performing an action in accordance with some embodiments. This method may be performed by an electronic device (such as computer 104-2 or computer network device 106 in FIG. 1).

During operation, the electronic device may receive a high-level operation (operation 210) from a second electronic device, where the electronic device provides a standby supervisory module for a computer network device (such as a switch or a router) and the second electronic device provides an active supervisory module for the computer network device, and where the high-level operation includes one or more sub-operations (such as primitive operations). Then, the electronic device may store the high-level operation (operation 212) in memory (such as a queue), where the high-level operation may be associated with an identifier in a sequential set of identifiers. Moreover, the electronic device may receive information indicating an occurrence of an event (operation 214). In response, the electronic device may perform the action (operation 216).

For example, the event may include completion of execution of the high-level operation by the second electronic device. In response, the action may include the electronic device performing the high-level operation. Alternatively, the event may include failure of the execution of the high-level operation by the second electronic device. In response, the action may include the electronic device not performing execution of the high-level operation. Furthermore, the event may include a failure or lack of availability of the second electronic device. In response, the action may include the electronic device performing the high-level operation and taking over as the active supervisory module. In some embodiments, the failure or lack of availability may be based at least in part on one or more pings or heartbeat messages to the second electronic device.

Note that when the electronic device and the second electronic device perform the high-level operation, their operational state and configuration data may be synchronized, without the second electronic device providing the operational state and the configuration data to the electronic device. In some embodiments, the electronic device and the second electronic device may have one or more threads, and a given thread may have the same context or may be mirrored in electronic device and the second electronic device.

Figure 3:
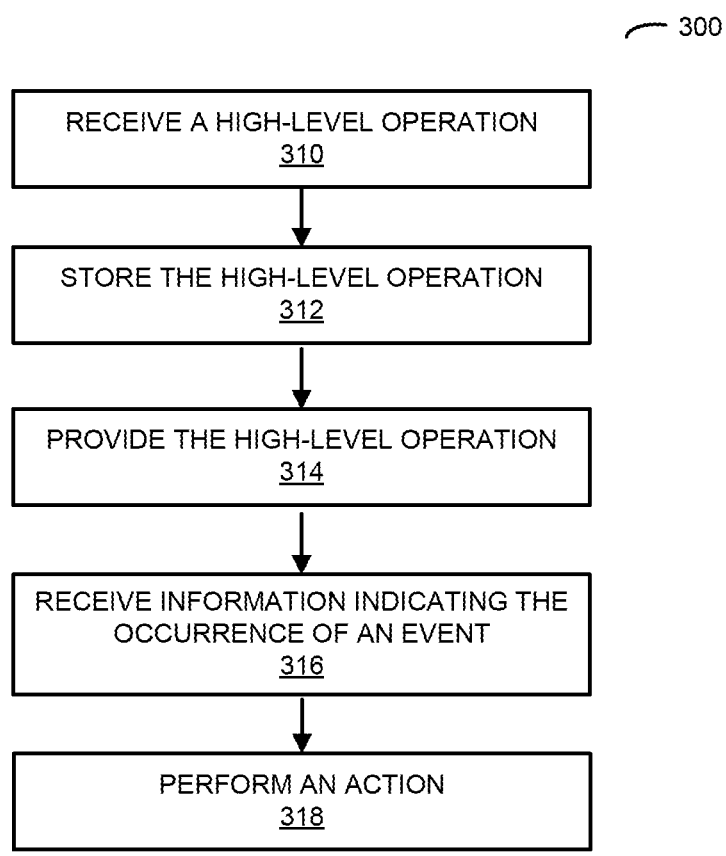
FIG. 3 is a flow diagram illustrating an example of a method for selectively performing an action using an electronic device in FIG. 1 in accordance with an embodiment of the present disclosure.

FIG. 3 presents a flow diagram illustrating an example of a method 300 for selectively performing an action in accordance with some embodiments. This method may be performed by a second electronic device (such as computer 104-1 or computer network device 106 in FIG. 1).

During operation, the second electronic device may receive a high-level operation (operation 310) (such as from a user, e.g., in a protocol packet that changes a configuration of a computer network device), where the second electronic device provides an active supervisory module for a computer network device (such as a switch or a router), and where the high-level operation includes one or more sub-operations (such as primitive operations). Then, the second electronic device may store the high-level operation (operation 312) in memory (such as a queue), where the high-level operation may be associated with an identifier in a sequential set of identifiers. Moreover, the second electronic device may provide the high-level operation (operation 314) to the electronic device that provides a standby supervisory module for the computer network device. Next, the second electronic device may receive information indicating an occurrence of an event (operation 316). In response, the second electronic device performs the action (operation 318).

For example, the event may include a confirmation from the electronic device that the high-level operation is being held or is pending. In response, the action may include the second electronic device performing the high-level operation. Alternatively, the event may include completion of execution of the high-level operation by the second electronic device. In response, the action may include the second electronic device instructing the electronic device to perform the high-level operation. Furthermore, the event may include failure of the execution of the high-level operation by the second electronic device. In response, the action may include the second electronic device instructing the electronic device not to perform or to abort the high-level operation.

Note that when the electronic device and the second electronic device perform the high-level operation, their operational state and configuration data may be synchronized, without the second electronic device providing the operational state and the configuration data to the electronic device. In some embodiments, the electronic device and the second electronic device may have one or more threads, and a given thread may have the same context or may be mirrored in electronic device and the second electronic device.

In some embodiments of methods 200 (FIG. 2) and/or 300, there may be additional or fewer operations. Furthermore, the order of the operations may be changed, and/or two or more operations may be combined into a single operation.

Figure 4:
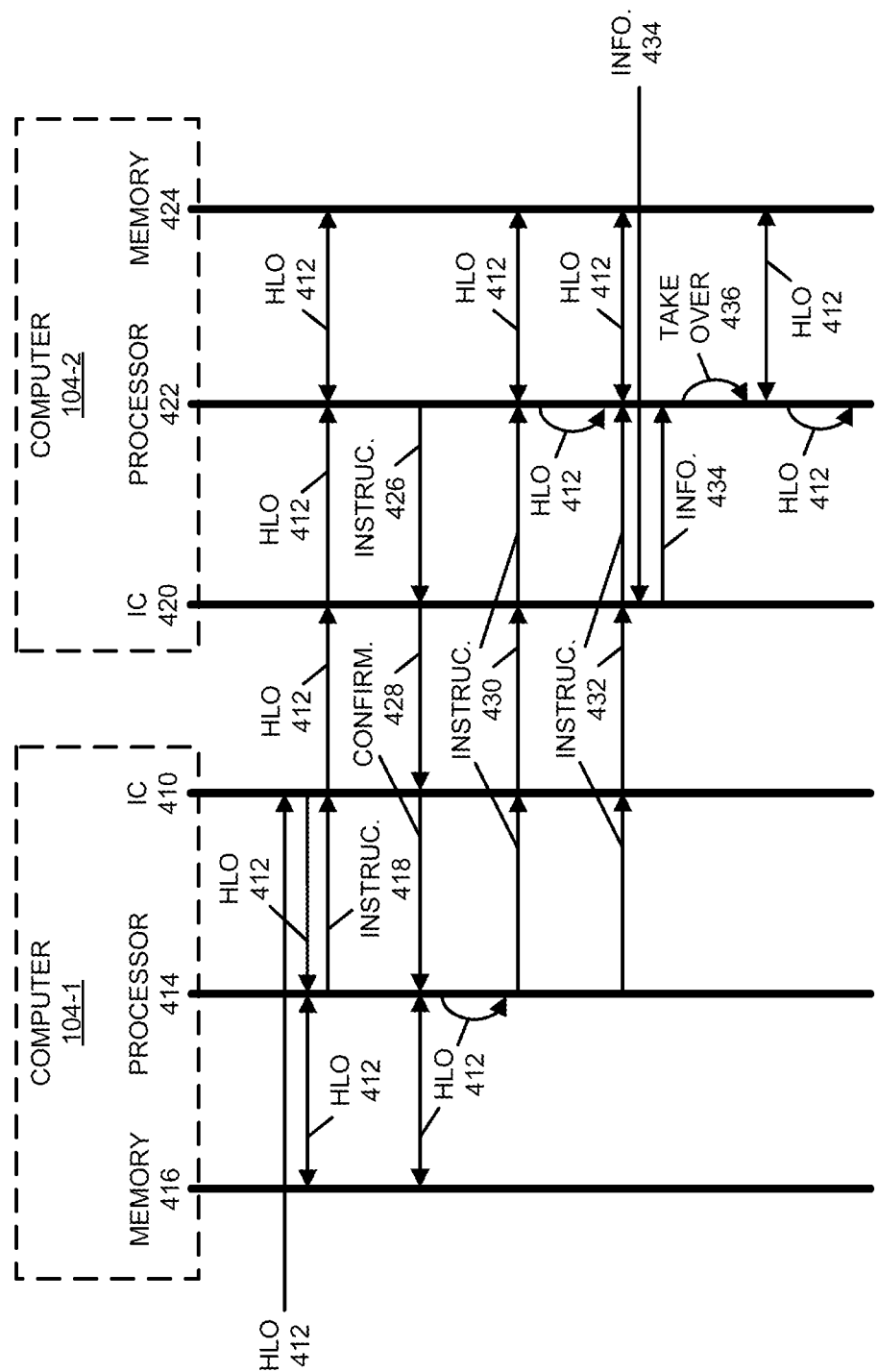
FIG. 4 is a drawing illustrating an example of communication among components in an electronic device in FIG. 1 in accordance with an embodiment of the present disclosure.
Figure 5:
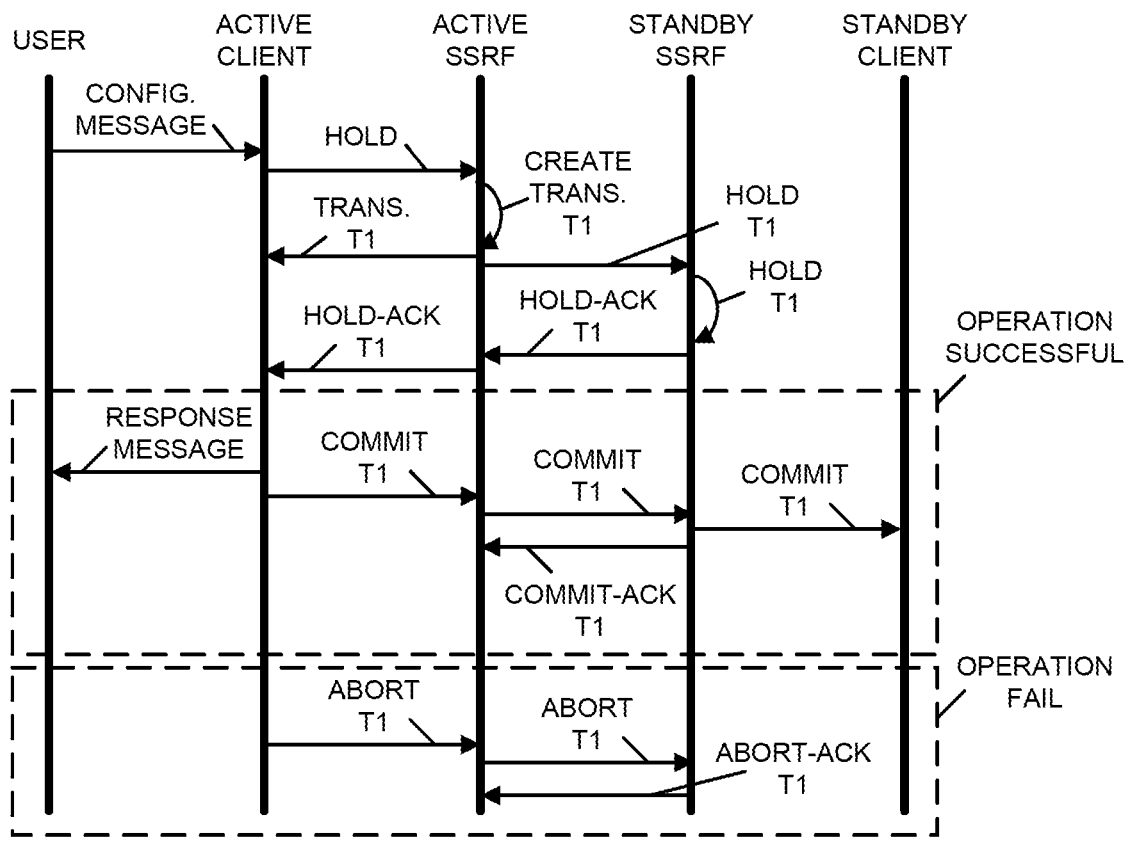
FIG. 5 is a drawing illustrating a technique for synchronizing an electronic device and a second electronic device in accordance with an embodiment of the present disclosure.

FIG. 4 presents a drawing illustrating an example of communication among computers 104 in accordance with some embodiments. Notably, an interface circuit (IC) 410 in computer 104-1 may receive a high-level operation (HLO) 412, where computer 104-1 provides an active supervisory module for a computer network device. Interface circuit 410 may provide the high-level operation 412 to processor 414 in computer 104-1, which may store the high-level operation 412 in memory 416 in computer 104-1. Moreover, processor 414 may instruct 418 interface circuit 410 to provide the high-level operation 412 to computer 104-2 that provides a standby supervisory module for the computer network device.

After receiving the high-level operation 412, interface circuit 420 in computer 104-2 may provide the high-level operation 412 to processor 422 in computer 104-2, which may store the high-level operation 412 in memory 424 in computer 104-2.

Next, computer 104-1 and/or computer 104-2 may receive information indicating an occurrence of an event, and in response may selectively perform an action. For example, processor 422 may instruct 426 interface circuit 420 to provide a confirmation 428 to computer 104-1 that the high-level operation 412 is being held or is pending in computer 104-2. Interface circuit 410 may provide confirmation 428 to processor 414, which may access the high-level operation 412 in memory 416 and may perform the high-level operation 412.

Moreover, processor 414 may complete execution of the high-level operation 412 and may, via interface circuit 410, provide an instruction 430 computer 104-2 to execute the high-level operation 412. After receiving instruction 430, interface circuit 420 may provide instruction 430 to processor 422, which may access the high-level operation 412 in memory 424 and may perform the high-level operation 412.

Alternatively, processor 414 may fail to execute or to complete execution of the high-level operation 412 and may, via interface circuit 410, provide an instruction 432 computer 104-2 to not perform or abort the high-level operation 412. After receiving instruction 432, interface circuit 420 may provide instruction 432 to processor 422, which may erase the high-level operation 412 from memory 424.

In some embodiments, interface circuit 420 may receive information 434 (such as from a low-level system that determines availability of computer 104-1 and/or computer 104-2 by providing one or more pings or heartbeat messages) that indicates that computer 104-2 has failed or is unavailable. In response, interface circuit 420 may provide information 434 to processor 422. Then, processor 422 may take over 436 as the active supervisory module (e.g., by instructing interface circuit 420 to provide a message to the computer network device) and may access the high-level operation 412 in memory 424 and may perform the high-level operation 412.

While FIG. 4 illustrates communication between components using unidirectional or bidirectional communication with lines having single arrows or double arrows, in general the communication in a given operation in these figures may involve unidirectional or bidirectional communication.

In some embodiments, the synchronization techniques provide a high availability framework (which is sometimes referred to as a 'smart synchronization and reconcile framework' or SSRF) that provides protection of operation at an operation level in a computer network device, such as a network switch or router. More generally, the synchronization techniques may be used with a wide variety of electronic devices, such as computers, servers and computer systems. Note that a computer network device may one or more switches or routers. For example, there may be separate routers or switches in a stacking architecture with stacking links. This stacking architecture may or may not include a common switching backplane.

Notably, the synchronization techniques may be used to synchronize active and standby supervisory modules. This synchronization may be based on the operations and not on the operational state and configuration data.

During the synchronization techniques, before a client task performs an operation on the active supervisory module, the corresponding client task may request that the SSRF hold a copy of that operation on the standby supervisory module. Upon successful holding of the operation copy on the standby supervisory module, the SSRF may acknowledge (ACK) the completion of the hold request to the client task on the active supervisory module. Then, upon receiving the acknowledgement of the hold request completion, the client task may perform the operation on the active supervisory module.

Moreover, upon successful completion of the operation on the active supervisory module, the client task may request that the SSRF commit the operation copy on the standby supervisory module, and the SSRF may request that the client task on the standby supervisory module commit the operation copy. The client task may commit the operation copy on the standby supervisory module by executing the same operation specific code path of the active supervisory module, thereby affecting the same changes in the operational state and the configuration data in memory as on the active supervisory module, but without modifying any hardware.

Alternatively, upon failure of the operation on the active supervisory module, the client task may request that the SSRF abort the operation copy on the standby supervisory module. In response, the SSRF may discard the operation copy on the standby supervisory module.

Note that SSRF may use a transaction model, so that the preceding operations are performed under a single unique transaction. SSRF may create a new transaction and return a new unique transaction identifier at the start of the synchronization techniques when the operation enters into the SSRF for hold. This transaction identifier may then be communicated in subsequent interactions between the SSRF and the client in the subsequent operations in the synchronization techniques. Moreover, a transaction may end with the completion of the processing of a commit or an abort. As noted previously, the operations in the synchronization techniques may depend on the specific event that occurs, such as depending on the outcome of executing the operation on the active supervisory module. This is summarized in FIG. 5, which presents a drawing illustrating a technique for synchronizing an electronic device and a second electronic device in accordance with some embodiments of the present disclosure.

Figure 6:
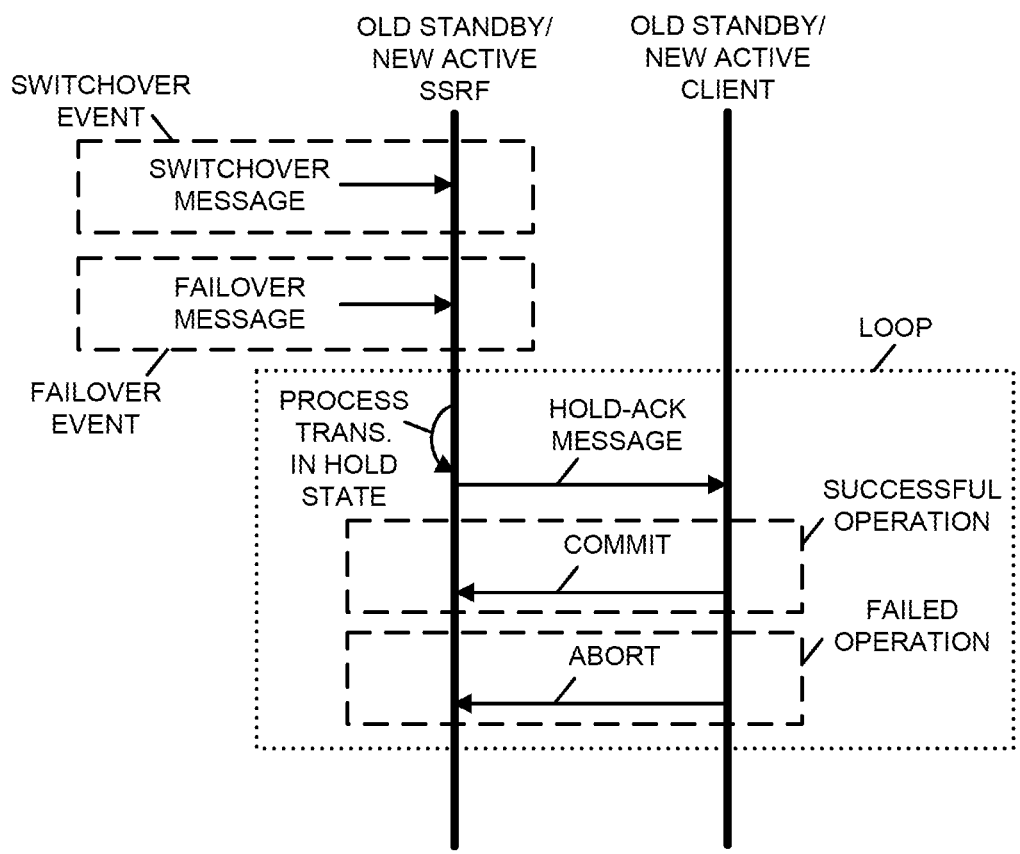
FIG. 6 is a drawing illustrating a technique for synchronizing an electronic device and a second electronic device in accordance with an embodiment of the present disclosure.

In the event that the active supervisory module fails, when the standby supervisory module takes over the active role (and becomes the new active supervisory module), the SSRF on this supervisory module may walk through all the pending transactions in its data structure that have not been completed yet (which are sometimes referred to as 'pending transactions'). These pending transactions may be processed immediately in sequential order of their transaction identifiers by delivering the corresponding hold-acknowledgments to the client. The client on the new active supervisory module may process these hold-acknowledgments in the manner identical to how they would have been processed on the old active supervisory module had it not fail. The special handling of a switchover/failover event is shown in FIG. 6, which presents a drawing illustrating a technique for synchronizing an electronic device and a second electronic device in accordance with some embodiments of the present disclosure.

Figure 7:
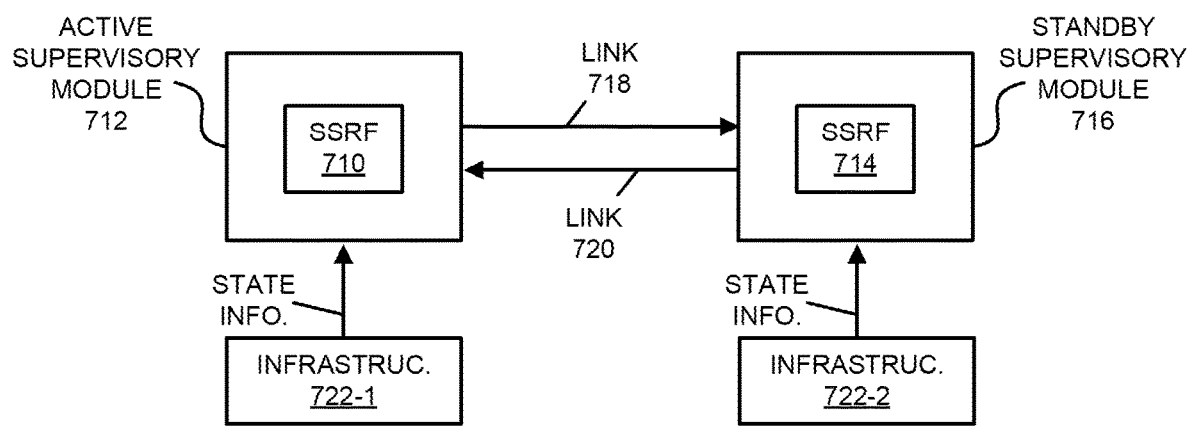
FIG. 7 is a drawing illustrating a technique for synchronizing an electronic device and a second electronic device in accordance with an embodiment of the present disclosure.

FIG. 7 presents a drawing illustrating a technique for synchronizing an electronic device and a second electronic device in accordance with some embodiments of the present disclosure. Notably, an SSRF 710 in an active supervisory module 712 and an SSRF 714 in a standby supervisory module 716 may interact with each other via a link 718 that conveys hold, commit and/or abort instructions and a link 720 that conveys a hold-acknowledgment. While FIG. 7 is illustrated with unidirectional links 718 and 720, in other embodiments one or more bi-directional links may be used. In addition, active supervisory module 712 and standby supervisory module 714 may interact with infrastructure 722 that determines their availability (such as by regularly providing one or more pings or heartbeat messages to a given supervisory module and determining a lack of availability when an acknowledgment is not received). Infrastructure 722-1 may alert SSRF 710 to the availability state of standby supervisory module 716 (such as available or down). Similarly, infrastructure 722-2 may alert SSRF 714 to the availability state of active supervisory module 710 (such as available or down).

In some embodiments, SSRFs 710 and 714 may be implemented in software and/or hardware. For example, a given SSRF may be implemented in an application layer in an open systems interconnection (OSI) model.

The synchronization techniques may offer the advantages of a faster development cycle for new features in a computer network device that require immediate and easy support of high availability.

We now describe embodiments of an electronic device, which may perform at least some of the operations in the synchronization techniques. FIG. 8 presents a block diagram illustrating an example of an electronic device 800 in accordance with some embodiments, such as one of computers 104, computer network device 106, controller 108, one of access points 110 or one of electronic devices 112. This electronic device includes processing subsystem 810, memory subsystem 812, and networking subsystem 814. Processing subsystem 810 includes one or more devices configured to perform computational operations. For example, processing subsystem 810 can include one or more microprocessors, ASICs, microcontrollers, programmable-logic devices, one or more graphics process units (GPUs) and/or one or more digital signal processors (DSPs).

Memory subsystem 812 includes one or more devices for storing data and/or instructions for processing subsystem 810 and networking subsystem 814. For example, memory subsystem 812 can include dynamic random access memory (DRAM), static random access memory (SRAM), and/or other types of memory. In some embodiments, instructions for processing subsystem 810 in memory subsystem 812 include: one or more program modules or sets of instructions (such as program instructions 822 or operating system 824), which may be executed by processing subsystem 810. Note that the one or more computer programs may constitute a computer-program mechanism. Moreover, instructions in the various modules in memory subsystem 812 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 810.

In addition, memory subsystem 812 can include mechanisms for controlling access to the memory. In some embodiments, memory subsystem 812 includes a memory hierarchy that comprises one or more caches coupled to a memory in electronic device 800. In some of these embodiments, one or more of the caches is located in processing subsystem 810.

In some embodiments, memory subsystem 812 is coupled to one or more high-capacity mass-storage devices (not shown). For example, memory subsystem 812 can be coupled to a magnetic or optical drive, a solid-state drive, or another type of mass-storage device. In these embodiments, memory subsystem 812 can be used by electronic device 800 as fast-access storage for often-used data, while the mass-storage device is used to store less frequently used data.

Networking subsystem 814 includes one or more devices configured to couple to and communicate on a wired and/or wireless network (i.e., to perform network operations), including: control logic 816, an interface circuit 818 and one or more antennas 820 (or antenna elements). (While FIG. 8 includes one or more antennas 820, in some embodiments electronic device 800 includes one or more nodes, such as nodes 808, e.g., a network node that can be coupled or connected to a network or link, or an antenna node, connector or a metal pad that can be coupled to the one or more antennas 820. Thus, electronic device 800 may or may not include the one or more antennas 820.) For example, networking subsystem 814 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, a cable modem networking system, and/or another networking system.

Networking subsystem 814 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 800 may use the mechanisms in networking subsystem 814 for performing simple wireless communication between the electronic devices, e.g., transmitting advertising or beacon frames and/or scanning for advertising frames transmitted by other electronic devices as described previously.

Within electronic device 800, processing subsystem 810, memory subsystem 812, and networking subsystem 814 are coupled together using bus 828. Bus 828 may include an electrical, optical, and/or electro-optical connection that the subsystems can use to communicate commands and data among one another. Although only one bus 828 is shown for clarity, different embodiments can include a different number or configuration of electrical, optical, and/or electro-optical connections among the subsystems.

In some embodiments, electronic device 800 includes a display subsystem 826 for displaying information on a display, which may include a display driver and the display, such as a liquid-crystal display, a multi-touch touchscreen, etc.

Electronic device 800 can be (or can be included in) any electronic device with at least one network interface. For example, electronic device 800 can be (or can be included in): a desktop computer, a laptop computer, a subnotebook/netbook, a server, a tablet computer, a smartphone, a cellular telephone, a smartwatch, a consumer-electronic device, a portable computing device, an access point, a transceiver, a router, a switch, communication equipment, a computer network device, a stack of computer network devices, a controller, test equipment, and/or another electronic device.

Although specific components are used to describe electronic device 800, in alternative embodiments, different components and/or subsystems may be present in electronic device 800. For example, electronic device 800 may include one or more additional processing subsystems, memory subsystems, networking subsystems, and/or display subsystems. Additionally, one or more of the subsystems may not be present in electronic device 800. Moreover, in some embodiments, electronic device 800 may include one or more additional subsystems that are not shown in FIG. 8. Also, although separate subsystems are shown in FIG. 8, in some embodiments some or all of a given subsystem or component can be integrated into one or more of the other subsystems or component(s) in electronic device 800. For example, in some embodiments program instructions 822 are included in operating system 824 and/or control logic 816 is included in interface circuit 818.

Moreover, the circuits and components in electronic device 800 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of electronic device 800 and/or networking subsystem 814. The integrated circuit may include hardware and/or software mechanisms that are used for transmitting wireless signals from electronic device 800 and receiving signals at electronic device 800 from other electronic devices. Aside from the mechanisms herein described, radios are generally known in the art and hence are not described in detail. In general, networking subsystem 814 and/or the integrated circuit can include any number of radios. Note that the radios in multiple-radio embodiments function in a similar way to the described single-radio embodiments.

In some embodiments, networking subsystem 814 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used Ethernet and a Wi-Fi communication protocol as an illustrative example, in other embodiments a wide variety of communication protocols and, more generally, wired and/or wireless communication techniques may be used. Thus, the synchronization techniques may be used with a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the synchronization techniques may be implemented using program instructions 822, operating system 824 (such as a driver for interface circuit 818) or in firmware in interface circuit 818. Alternatively or additionally, at least some of the operations in the synchronization techniques may be implemented in a physical layer, such as hardware in interface circuit 818.

In the preceding description, we refer to 'some embodiments.' Note that 'some embodiments' describes a subset of all of the possible embodiments, but does not always specify the same subset of embodiments. Moreover, note that numerical values in the preceding embodiments are illustrative examples of some embodiments. In other embodiments of the synchronization techniques, different numerical values may be used.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
   an interface circuit configured to communicate with a second electronic device;
   a processor; and
   memory configured to store program instructions, wherein, when executed by the processor, the program instructions cause the electronic device to perform operations comprising:
      receiving a high-level operation associated with the second electronic device, wherein the electronic device is configured to provide a standby supervisory module for a computer network device and the second electronic device is configured to provide an active supervisory module for the computer network device, and wherein the high-level operation comprises one or more sub-operations and the one or more sub-operations comprise primitive operations;
      storing the high-level operation in the memory;
      receiving from the second electronic device, information indicating an occurrence of an event; and
      when the event comprises a first type of event in which there is completion of execution of the high-level operation by the second electronic device, performing an action, wherein the action comprises the electronic device performing the high-level operation, wherein performing the action comprises affecting same changes in an operational state and configuration data in the memory as on the second electronic device, but without modifying hardware in the electronic device; and
      when the event comprises a second type of event in which there is failure of the execution of the high-level operation by the second electronic device, the electronic device does not perform execution of the high-level operation.

2. The electronic device of claim 1, wherein the computer network device comprises a switch or a router.

3. The electronic device of claim 1, wherein the high-level operation is associated with an identifier in a sequential set of identifiers.

4. The electronic device of claim 1, wherein the event comprises a third type of event in which there is a failure or lack of availability of the second electronic device; and
   wherein the action comprises the electronic device performing the high-level operation and taking over as the active supervisory module.

5. The electronic device of claim 4, wherein the failure or lack of availability is based at least in part on one or more pings or heartbeat messages addressed to the second electronic device.

6. The electronic device of claim 1, wherein, when the electronic device and the second electronic device perform the high-level operation, operational states and configuration data of the electronic device and the second electronic device are synchronized, without the electronic device receiving the operational state and the configuration data associated with the second electronic device.

7. The electronic device of claim 1, wherein the electronic device and the second electronic device have one or more threads, and a given thread has the same context or is mirrored in electronic device and the second electronic device.

8. A non-transitory computer-readable storage medium for use in conjunction with an electronic device, the computer-readable storage medium storing program instructions that, when executed by the electronic device, causes the electronic device to perform operations comprising:
   receiving a high-level operation associated with a second electronic device, wherein the electronic device provides a standby supervisory module for a computer network device and the second electronic device provides an active supervisory module for the computer network device, and wherein the high-level operation comprises one or more sub-operations and the one or more sub-operations comprise primitive operations;

storing the high-level operation in memory associated with the electronic device;

receiving, from the second electronic device, information indicating an occurrence of an event; and when the event comprises a first type of event in which there is completion of execution of the high-level operation by the second electronic device, performing an action, wherein the action comprises the electronic device performing the high-level operation, wherein performing the action comprises affecting same changes in an operational state and configuration data in the memory as on the second electronic device, but without modifying hardware in the electronic device; and when the event comprises a second type of event in which there is failure of the execution of the high-level operation by the second electronic device, the electronic device does not perform execution of the high-level operation.

9. The non-transitory computer-readable storage medium of claim 8, wherein the computer network device comprises a switch or a router.

10. The non-transitory computer-readable storage medium of claim 8, wherein the high-level operation is associated with an identifier in a sequential set of identifiers.

11. The non-transitory computer-readable storage medium of claim 8, wherein the event comprises a third type of event in which there is a failure or lack of availability of the second electronic device; and wherein the action comprises the electronic device performing the high-level operation and taking over as the active supervisory module.

12. The non-transitory computer-readable storage medium of claim 8, wherein, when the electronic device and the second electronic device perform the high-level operation, operational states and configuration data of the electronic device and the second electronic device are synchronized, without the electronic device receiving the operational state and the configuration data associated with the second electronic device.

13. A method for selectively performing an action, comprising:

by an electronic device:

receiving a high-level operation associated with a second electronic device, wherein the electronic device provides a standby supervisory module for a computer network device and the second electronic device provides an active supervisory module for the computer network device, and wherein the high-level operation comprises one or more sub-operations and the one or more sub-operations comprise primitive operations;

storing the high-level operation in memory associated with the electronic device;

receiving, from the second electronic device, information indicating an occurrence of an event; and when the event comprises a first type of event in which there is completion of execution of the high-level operation by the second electronic device, performing an action, wherein the action comprises the electronic device performing the high-level operation, wherein performing the action comprises affecting same changes in an operational state and configuration data in the memory as on the second electronic device, but without modifying hardware in the electronic device; and when the event comprises a second type of event in which there is failure of the execution of the high-level operation by the second electronic device, the electronic device does not perform execution of the high-level operation.

14. The method of claim 13, wherein the event comprises a third type of event in which there is a failure or lack of availability of the second electronic device; and wherein the action comprises the electronic device performing the high-level operation and taking over as the active supervisory module.

15. The method of claim 13, wherein the computer network device comprises a switch or a router.

16. The method of claim 13, wherein the high-level operation is associated with an identifier in a sequential set of identifiers.

17. The method of claim 13, wherein, when the electronic device and the second electronic device perform the high-level operation, operational states and configuration data of the electronic device and the second electronic device are synchronized, without the electronic device receiving the operational state and the configuration data associated with the second electronic device.

* * * * *